(12) United States Patent
Engelhardt et al.

(10) Patent No.: US 6,738,190 B2
(45) Date of Patent: *May 18, 2004

(54) METHOD FOR EXAMINING A SPECIMEN

(75) Inventors: Johann Engelhardt, Bad Schoenborn (DE); Juergen Hoffmann, Wiesbaden (DE); Werner Knebel, Kronau (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 330 days.

This patent is subject to a terminal disclaimer.

(21) Appl. No.: 09/947,334

(22) Filed: Sep. 5, 2001

(65) Prior Publication Data

US 2002/0027709 A1 Mar. 7, 2002

(30) Foreign Application Priority Data

Sep. 5, 2000 (DE) .......................... 100 43 992

(51) Int. Cl.⁷ ............................................. G02B 21/00
(52) U.S. Cl. ........................ 359/368; 359/369; 359/373
(58) Field of Search ................................. 359/362–363, 359/368–390; 250/458.1, 459.1; 382/128, 283, 455, 133

(56) References Cited

U.S. PATENT DOCUMENTS 5,107,422 A * 4/1992 Kamentsky et al. ........ 382/133
5,655,029 A * 8/1997 Rutenberg et al. .......... 382/133
6,148,096 A * 11/2000 Pressman et al. ........... 382/133
6,404,906 B2 * 6/2002 Bacus et al. ................. 382/128
6,614,031 B2 * 9/2003 Engelhardt et al. ...... 250/459.1

OTHER PUBLICATIONS

Leica TCS 4D UV –The System Concept for Multiparameter Confocal Microscopy, Scientific and Technical Information vol. XI, No.1, pp.9–19, Jun. 1995.
P. Wedekind et al., "Scanning microphotolysis: a new photobleaching technique based on fast intensity modulation of a scanned laser beam and confocal imaging", Journal of Microscopy, vol 176, Part 1, Oct. 1994, pp. 23–33.
English Language abstract of DE 19829981.

* cited by examiner

*Primary Examiner*—Thong Q. Nguyen
(74) *Attorney, Agent, or Firm*—Davidson, Davidson & Kappel, LLC

(57) ABSTRACT

A method for examining a specimen (11) by means of a confocal scanning microscope having at least one light source (1), preferably a laser, to generate an illuminating light beam (4) for the specimen (11), and a beam deflection device (9) to guide the illuminating light beam (4) over the specimen (11) comprises the following method steps: Firstly a preview image is acquired. Then at least one region of interest in the preview image is marked. This is followed by allocation of individual illuminating light beam wavelengths and/or illuminating light beam power levels to the region or regions. Illumination of the region or regions of the specimen (11) in accordance with the allocation is then accomplished. Lastly, the reflected and/or fluorescent light proceeding from the specimen (11) is detected.

8 Claims, 5 Drawing Sheets

METHOD FOR EXAMINING A SPECIMEN

CROSS REFERENCE TO RELATED APPLICATIONS

This invention claims priority of the German patent application 100 43 992.6 which is incorporated by reference herein.

FIELD OF THE INVENTION

The present invention concerns a method for examining a specimen by means of a confocal scanning microscope.

BACKGROUND OF THE INVENTION

A method for examining a specimen by means of a scanning microscope, and a confocal scanning microscope, of the kinds cited above are known from practical use. In known scanning microscopy, a specimen is illuminated with an illuminating light beam in order to observe the reflected or fluorescent light emitted from the specimen. The focus of the illuminating light beam is generally moved in one specimen plane by tilting two mirrors, the deflection axes usually being perpendicular to one another so that one mirror deflects in the X direction and the other in the Y direction. The tilting of the mirrors that substantially constitute the beam deflection device is brought about, for example, with the aid of galvanometer positioning elements, both fast resonant galvanometers as well as slower and more accurate non-resonant galvanometers being used. The power of the light coming from the specimen is measured as a function of the position of the scanning beam or illuminating light beam.

In confocal scanning microscopy specifically, a specimen is scanned in three dimensions with the focus of an illuminating light beam. A confocal scanning microscope generally comprises a light source, a focusing optical system with which the light of the light source is focused onto a pinhole, a beam splitter, a beam deflection device for beam control, a microscope optical system, a detection pinhole, and detectors for detecting the reflected or fluorescent light. The illuminating light or illuminating light beam must usually be coupled in via a beam splitter. The fluorescent or reflected light coming from the specimen passes, in the most commonly used descan arrangement, via the same scanning mirrors or the same beam deflection device back to the beam splitter and passes through the latter, then being focused onto the detection pinhole behind which the detectors (usually photomultipliers) are located. Detected light that does not derive directly from the focus region takes a different light path and does not pass through the detection stop; what is obtained is a point datum that results, by way of sequential scanning of the specimen, in a three-dimensional image. A three-dimensional image is usually achieved by acquiring image data in layers.

At present, specimens are usually illuminated over the entire scan field with light of one wavelength, or simultaneously with light of several wavelengths. For this reason, comparative examinations whose purpose is to examine specimens under different spectral illumination conditions but under otherwise identical boundary conditions are performed sequentially on one specimen or sequentially on identically prepared specimens.

In the case of examinations based on fluorescence resonance energy transfer (FRET), molecules are excited optically, for example with light at the 488 nm wavelength. The emitted light of these so-called donor molecules, which in the present example would have a wavelength of approx. 543 nm, results, by way of so-called Förster transfer, in the excitation of other closely adjacent molecules (acceptor molecules). The latter then emit light at a wavelength of approx. 570 nm. At present, to control specimen preparation for experiments based on fluorescence resonance energy transfer (FRET), test measurements are performed before the actual examinations are made. In the present example irradiation would first be applied with light at a wavelength of 534 nm, in order to excite the acceptor molecules directly and in order to acquire an image at the detection wavelength of 570 nm. The specimen would then be displaced mechanically, for example with an X-Y stage, and the "actual" examination would be performed at a different point using excitation light at the 488 nm wavelength.

In order to rule out direct excitation of the acceptor with the light that is actually intended for excitation of the donor (in this example, 488 nm), the bleaching behavior of the acceptor and donor can be measured in direct excitation. From a comparison between the bleaching coefficients with direct excitation and those with FRET excitation, conclusions can be drawn as to the degree of direct excitation.

Ideally, the track of the deflected illuminating light beam on the specimen surface—or, in the case of a confocal arrangement, in a layer plane in the specimen—should describe a meander. This involves first scanning a line in the X direction at a constant Y position, then a Y displacement with no change in X position, and then scanning a line in the negative X position at a constant Y position. In reality, because of the inertia of the moving galvanometer components and the mirrors of the beam deflection device, a meander shape of this kind can be approximately achieved only for low scanning rates. At reasonable scanning rates of more than 100 Hz, the scanning track of the illuminating light beam actually describes a sine-like curve, which creates the need for correction of the resulting deviations from the ideal situation. For example, the track speed in the vicinity of the reversal points is lower than in the linear sine region, resulting (inter alia) in greater bleaching in those regions. It has therefore been usual for some time to interrupt the specimen illumination while passing through the reversing portions, using mechanical stops that limit the image field or by means of suitable optical arrangements—for example with acoustooptical modulators (AOTFs). This technique of interrupting the beam during scanning is called "blanking." An arrangement with mechanical stops was incorporated as early as 1990 in a confocal laser scanning microscope of the applicant. An arrangement having an acoustooptical modulator is described in Scientific and Technical Information Vol. XI, No. 1, pp. 9–19, June 1995, "Leica TCS 4D UV—The system concept for Multiparameter Confocal Microscopy." This document explains the sine-like trajectory and the problems associated with it, although blanking is not explicitly mentioned. Controlled bleaching-out of any desired predefinable specimen regions using an AOTF arrangement, which makes it possible to illuminate various regions of a specimen with different light intensities, is described in P. Wedekind et al., "Scanning microphotolysis: a new photobleaching technique based on fast intensity modulation of a scanned laser beam and confocal imaging," Journal of Microscopy, Vol. 176, Part 1, October 1994, pp. 23–33. This document illustrates a blanking technique at a very high technical level.

Unexamined Patent Application DE 198 29 981 of Carl Zeiss Jena GmbH, "Method and arrangement for confocal microscopy," describes the elimination of the bleaching problem, and additionally the elimination of bleed-through, by the fact that the spectral composition and/or the intensity of the laser light coupled into the microscope beam path is modified while deflection continues without interruption; as a result, at least two adjacent locations or scan points of the specimen are impinged upon by light of differing spectral properties and/or different intensity.

A problem with the known method and the known confocal scanning microscope is that it is not clear how a detail of a specimen that is to be evaluated can be selected for differentiated illumination. Reliable selection and definition of the details of interest in the specimen is therefore not possible.

SUMMARY OF THE INVENTION

It is therefore an object of the present invention to provide a method for examining a specimen, which enables a user to select specific regions of interest and limit information collection to the selected regions.

The present invention provides a for examining a specimen by means of a confocal scanning microscope comprising the steps of:

- generating an illuminating light beam with at least one light source,
- deflecting, with a beam deflection device, the illuminating light beam over a specimen,
- acquiring a preview image;
- marking of at least one region of interest in the preview image;
- allocating individual illuminating light beam wavelengths or illuminating light beam power levels to the at least one region of interest;
- illuminating at least one region of the specimen in accordance with the allocation, the at least one region of the specimen corresponding to the at least one region of interest in the preview image, wherein the illuminating light beam is guided such that substantially only the at least one region of the specimen is illuminated, and
- detecting reflected and fluorescent light proceeding from the at least one region of specimen.

First a preview image is acquired. This supplies to the observer a visual depiction of the specimen being examined. Marking of at least one region of interest in the preview image is then accomplished. These two method steps make possible, in a manner according to the present invention, particularly simple selection and definition of a detail of interest of a specimen. The observer simply needs to study the preview image in order then to make a marking in the preview image.

This is then followed by an allocation of individual illuminating light beam wavelengths and/or illuminating light beam power levels to the region or regions. The region or regions of the specimen is or are then illuminated in accordance with the allocation, followed by detection of the reflected and/or fluorescent light proceeding from the specimen. This completes the examination method. In this context, quite individually selected regions can be illuminated.

In particularly simple fashion, the beam deflection device could comprise galvanometer positioning elements. Galvanometer positioning elements of this kind could preferably be controllable by way of a computer, with which the beam deflection speeds can be adapted individually to requirements in terms of the marked region or regions.

BRIEF DESCRIPTION OF THE DRAWINGS

There are various ways of advantageously embodying and developing the teaching of the present invention. In conjunction with the explanation of an exemplary embodiment of the invention with reference to the drawings, an explanation is also given of generally preferred embodiments and developments of the teaching. In the drawings.

DETAILED DESCRIPTION OF THE INVENTION

Figure 1:
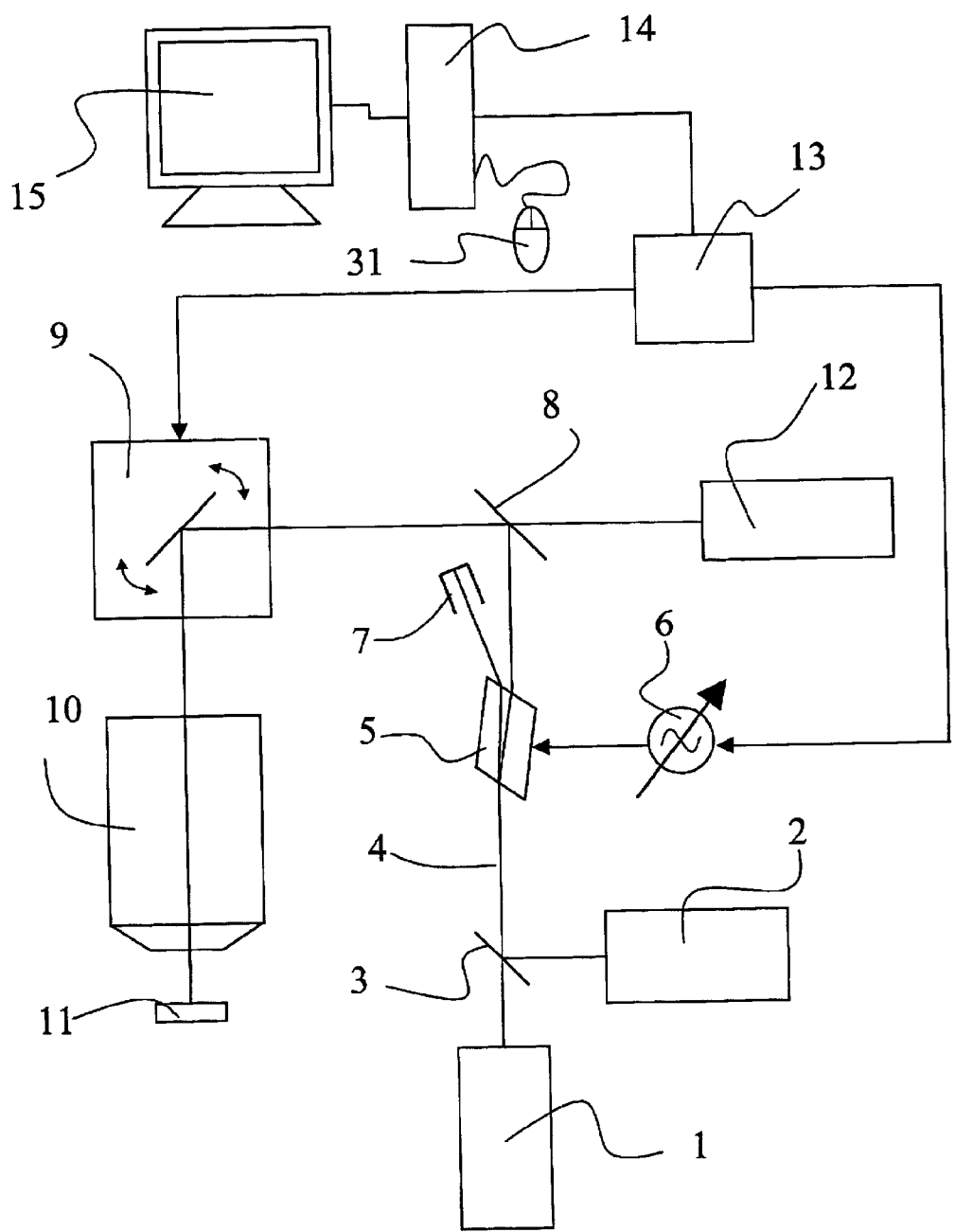
FIG. 1 schematically depicts the exemplary embodiment of a confocal scanning microscope according to the present invention.

In an advantageous embodiment of the method, in order to avoid any undesired exposure of the specimen outside the region or regions to be examined, the illuminating light beam could be guided in such a way that substantially only the marked region or regions of the specimen are illuminated. The illuminating light beam could travel the shortest distance to the selected region or regions, or between the selected regions.

In particularly advantageous fashion, the method could be utilized in examinations that are based on fluorescence resonance energy transfer (FRET). Preparation control can thereby be simplified. A control measurement with light of the acceptor molecule excitation wavelength could be performed in one region, while a FRET measurement with the donor excitation wavelength is performed quasi-simultaneously in another region. The acceptor molecule excitation wavelength could be, for example, 543 nm, while the donor excitation wavelength could be 488 nm.

Respective bleaching coefficients could be ascertained in two regions quasi-simultaneously. This is of interest in particular for time-critical experiments with living specimens.

In addition, the extent of direct excitation of the acceptor with excitation light for the donor could be ascertained by measuring the fluorescent photon yield while simultaneously bleaching out the acceptor with light of the acceptor molecule excitation wavelength.

It is also conceivable to use a first control measurement with the acceptor molecule excitation wavelength to identify the location of the acceptor molecules, store it, and then illuminate with light of the donor excitation wavelength exclusively at those locations. The remainder of the image could then remain unilluminated or could be observed with a different light wavelength.

In both a two-dimensional X-Y depiction and in a three-dimensional X-Y-Z depiction, the region or regions of interest of the specimen could be selected or marked by way of a computer and preferably a computer mouse.

The allocation of individual illuminating light beam wavelengths and/or illuminating light beam power levels to the region or regions could then also be accomplished by way of a computer of this kind.

To prevent illumination of the specimen outside the region or regions, a definable blanking could be performed. In this, the illuminating light beam is interrupted in controlled fashion during scanning, so that the unmarked regions are not illuminated at all. As a result, the region or regions is or are particularly emphasized, and the unmarked remaining region of the specimen is not unnecessarily bleached out.

To achieve higher contrast and to decrease the total data acquisition time, the region or regions could be scanned more slowly and with elevated photon statistics as compared to the remainder of the specimen.

Outside the region or regions or between the regions, the specimen could be scanned at the maximum deflection speed. A further reduction in total data acquisition time could be achieved by the fact that outside the region or regions or between the regions, beam deflection deviates from sinusoidal, sawtooth-shaped, or meander-shaped beam deflection. The regions could thereby be arrived at over a shorter distance. Ideally, beam deflection between two regions or the regions could be accomplished substantially in a direct line from one region to another region.

A confocal scanning microscope used for carrying out the inventive method could comprise a spectrally selective element for setting the illuminating light beam wavelength or wavelengths. The spectrally selective element could be an AOTF (acoustooptical tunable filter), an AOD (acoustooptical deflector), an EOM (electrooptical modulator), or a mechanical component. Acoustooptical tunable filters are characterized by great flexibility, and make it possible to switch over the illuminating light beam wavelengths, introduce light of one or more wavelengths, or vary the light power level, very quickly, i.e. in the range of approx. 1 μs or less.

A spectrally selective element of this kind could be controllable by way of a computer, preferably as a function of the deflection position.

The confocal scanning microscope could furthermore comprise an element for adjusting the illuminating light beam power level. An element of this kind for adjusting the illuminating light beam power level could comprise an AOTF or a mechanical component. The element for adjusting the illuminating light beam power level could also be controllable by way of a computer, preferably as a function of the deflection position.

In particularly simple fashion, the same element could be usable for adjusting the illuminating light beam wavelength or wavelengths and for adjusting the illuminating light beam power level. An AOTF is particularly suitable in this context.

To make available several different illuminating light beam wavelengths, several lasers could be provided to generate the illuminating light beam. Alternatively, one or more multiple-line lasers could also be provided to generate the illuminating light beam.

A PC, on whose monitor the image or preview image of the specimen is displayed, could be usable for displaying and marking the region or regions.

The marking of a three-dimensional region or regions could be performable in an X, Y, Z depiction or in two-dimensional sectioned depictions.

In particularly simple fashion, the beam deflection device could comprise galvanometer positioning elements. Galvanometer positioning elements of this kind could preferably be controllable by way of a computer, with which the beam deflection speeds can be adapted individually to requirements in terms of the marked region or regions.

FIG. 1 schematically depicts an exemplary embodiment of a confocal scanning microscope according to the present invention for examining a specimen 11. The confocal scanning microscope has a light source 1 in the form of a first laser. The scanning microscope furthermore has a second laser 2 in the form of a multiple-line laser. The light beams generated by the first and the second laser 2 are combined by means of a beam combiner 3 to form illuminating light beam 4.

Illuminating light beam 4 passes through an AOTF 5 that is operated by means of an AOTF high-frequency controller 6. Following AOTF 5 is a beam trap 7. The illuminating light selected by AOTF 5 is reflected by means of a main beam splitter 8 onto a beam deflection device 9. Downstream from beam deflection device 9 is an objective 10 that directs the illuminating light onto specimen 11.

Also provided is a detector 12 for fluorescent or reflected light.

A control computer 13 is provided to control AOTF high-frequency control system 6 and beam deflection device 9. Control computer 13 is coupled to a PC 14 and a monitor 15, thereby making it possible to display specimen 11 and to mark the regions of interest by means of a computer mouse 31.

Figure 2:
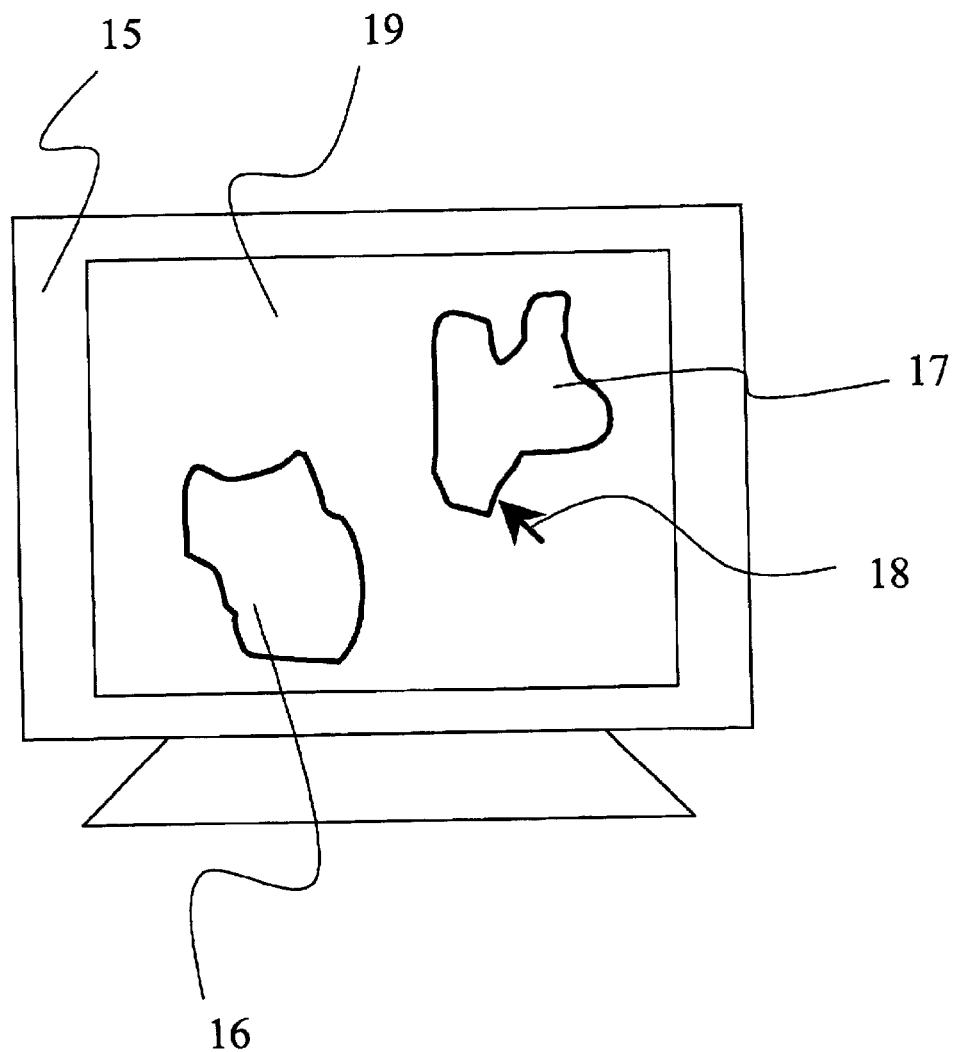
FIG. 2 schematically depicts two two-dimensional regions depicted by means of a monitor, FIG. 3 schematically depicts the marked regions as shown in FIG. 2, with a sinusoidal scanning track of the illuminating light beam for the specimen.

FIG. 2 schematically depicts two marked two-dimensional regions 16 and 17 depicted by means of monitor 15. Regions 16 and 17 are to be illuminated with light of different wavelengths. A cursor 18, which can be guided over preview image 19, is provided for marking regions 16 and 17. A bordering line visible to the user is drawn by pressing a mouse button while moving around regions 16 and 17.

Figure 3:
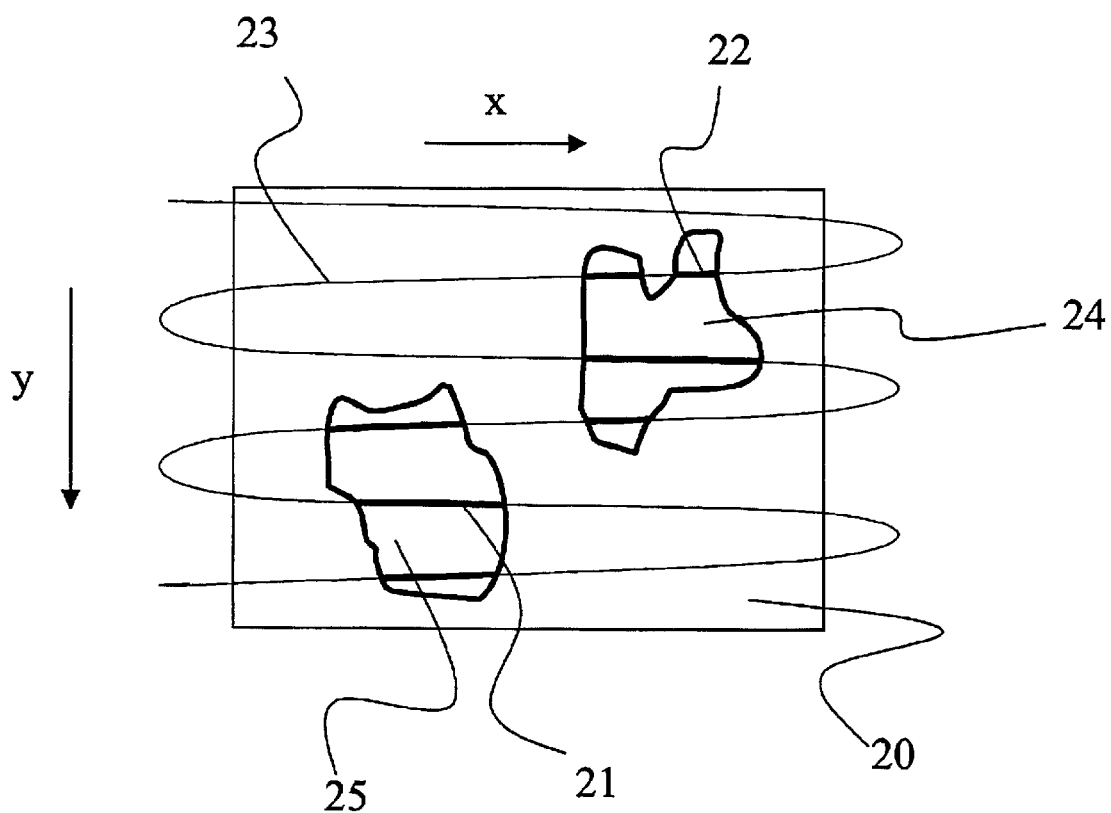

FIG. 3 schematically depicts specimen regions 24 and 25 which correspond to marked regions 17 and 16 as shown in FIG. 2, scan field 20 being scanned sinusoidally along a scanning track 23. Specimen region 25 is subjected to an illumination 21 with wavelength $\lambda_1$, whereas specimen region 24 is subjected to an illumination 22 with wavelength $\lambda_2$.

Figure 4:
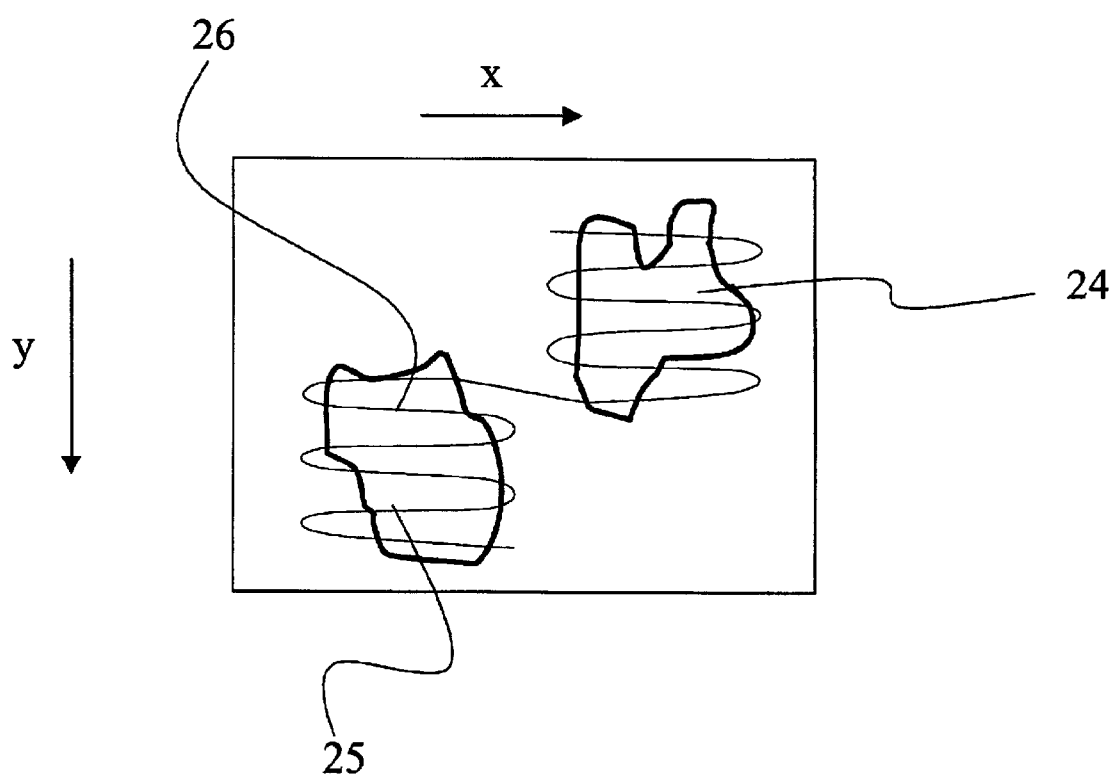
FIG. 4 schematically depicts the marked regions as shown in FIG. 2, the regions being specifically scanned.

FIG. 4 schematically depicts specimen regions 24 and 25, regions 24 and 25 being specifically scanned. For that purpose, a region-adapted scanning track 26 is generated. Beam deflection between regions 24 and 25 is accomplished substantially directly, which prevents any bleaching of specimen regions outside regions 24 and 25 and reduces the dead time between scanning of specimen regions 24 and 25. In addition, the illuminating light beam can be interrupted by means of AOTF 5 after region 24 is scanned, until the scanning of region 25 begins.

Figure 5:
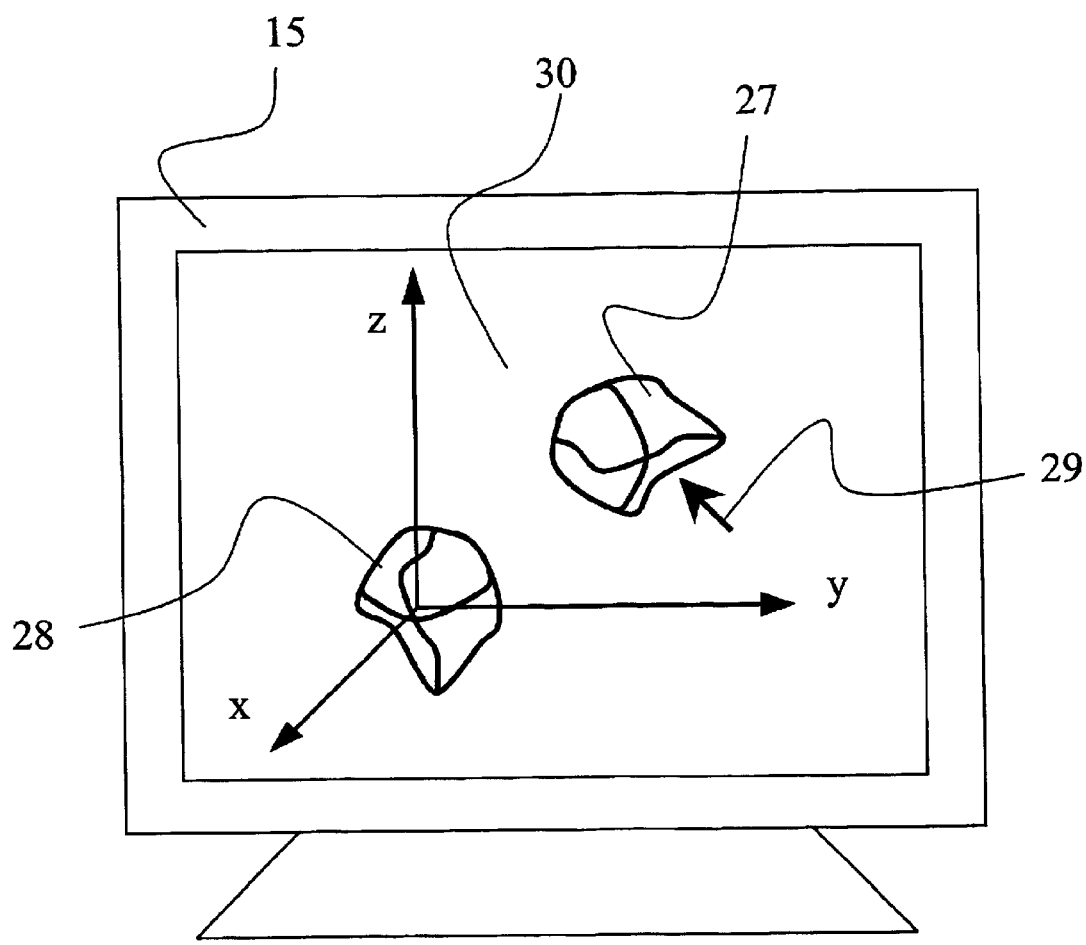
FIG. 5 schematically depicts two marked three-dimensional regions depicted by means of a monitor.

FIG. 5 schematically depicts two marked three-dimensional regions 27 and 28 depicted by means of monitor 15. Also shown is a cursor 29 for region marking. A three-dimensional preview image 30 is thereby formed. Here again, specimen regions 27 and 28 are to be illuminated with light of different wavelengths and/or different intensities.

In conclusion, be it noted expressly that the exemplary embodiment of the confocal scanning microscope according to the present invention that is described above serves merely for discussion of the teaching claimed, but does not limit it to the exemplary embodiment.

What is claimed is:

1. A method for examining a specimen by means of a confocal scanning microscope comprising the steps of:

generating an illuminating light beam with at least one light source, deflecting, with a beam deflection device, the illuminating light beam over a specimen, acquiring a preview image;

marking of at least one region of interest in the preview image;

allocating individual illuminating light beam wavelengths or illuminating light beam power levels to the at least one region of interest, illuminating at least one region of the specimen in accordance with the allocation, the at least one region of the specimen corresponding to the at least one region of interest in the preview image, wherein the illuminating light beam is guided such that substantially only the at least one marked region of the specimen is illuminated, and detecting reflected and fluorescent light proceeding from the at least one region of specimen.

2. The method as defined in claim 1, wherein the at least one region of interest is marked by way of a pointer or a computer mouse.

3. The method as defined in claim 1, wherein a computer is provided for allocating of individual illuminating light beam wavelengths or illuminating light beam power levels to the at least one region.

4. The method as defined in claim 1, wherein a definable blanking is performed to prevent illumination of the specimen outside of the at least one region of of the specimen.

5. The method as defined in claim 1, wherein the at least one region of the specimen is scanned more slowly and with elevated photon statistics as compared to the remainder of the specimen.

6. The method as defined in claim 1, wherein outside the at least one region of the specimen or between at least two regions of the specimen, the specimen is scanned at the maximum deflection speed.

7. The method as defined in claim 1, wherein outside the at least one region of the specimen or between at least two regions of the specimen, beam deflection deviates from sinusoidal, sawtooth-shaped, or meander-shaped beam deflection.

8. The method as defined in claim 1, wherein beam deflection between at least two regions of the specimen is accomplished substantially in a direct line from one region of the specimen to another region of the specimen.

* * * * *